United States Patent

Gauckler et al.

[11] Patent Number: 6,136,241
[45] Date of Patent: Oct. 24, 2000

[54] METHOD FOR THE FORMING OF CERAMIC GREEN PARTS

[75] Inventors: Ludwig J. Gauckler; Thomas Graule, both of Schaffhausen, Switzerland

[73] Assignee: Ceramtec AG Innovative Ceramic Engineering, Germany

[21] Appl. No.: 09/036,948

[22] Filed: Mar. 9, 1998

Related U.S. Application Data

[60] Division of application No. 08/624,715, Mar. 26, 1996, Pat. No. 5,788,891, which is a continuation-in-part of application No. 08/211,139, May 9, 1994, abandoned.

[51] Int. Cl.[7] .................................. B28B 1/14; B28B 1/26
[52] U.S. Cl. ........................ 264/109; 264/86; 264/102; 264/334; 264/603
[58] Field of Search ................................ 264/603, 102, 264/109, 334, 86

[56] References Cited

U.S. PATENT DOCUMENTS 5,188,780  2/1993  Lange et al. ........................... 501/1

Primary Examiner—Christopher A. Fiorilla
Attorney, Agent, or Firm—Bachman & LaPointe, P.C.

[57] ABSTRACT

The well known slip casting process for the production of ceramic green parts, in which hardening is achieved by water removal with porous molds, is characterized by disadvantages in terms of strength, shrinkage during drying and problems with cracking during drying. The present invention avoids these disadvantages and produces ceramic green parts by changing the surface potential of powder particles in the slip instead of by removing water. Further more the coagulation strength is increased by adding polymers or extremely fine divided colloidal particles.

20 Claims, 1 Drawing Sheet

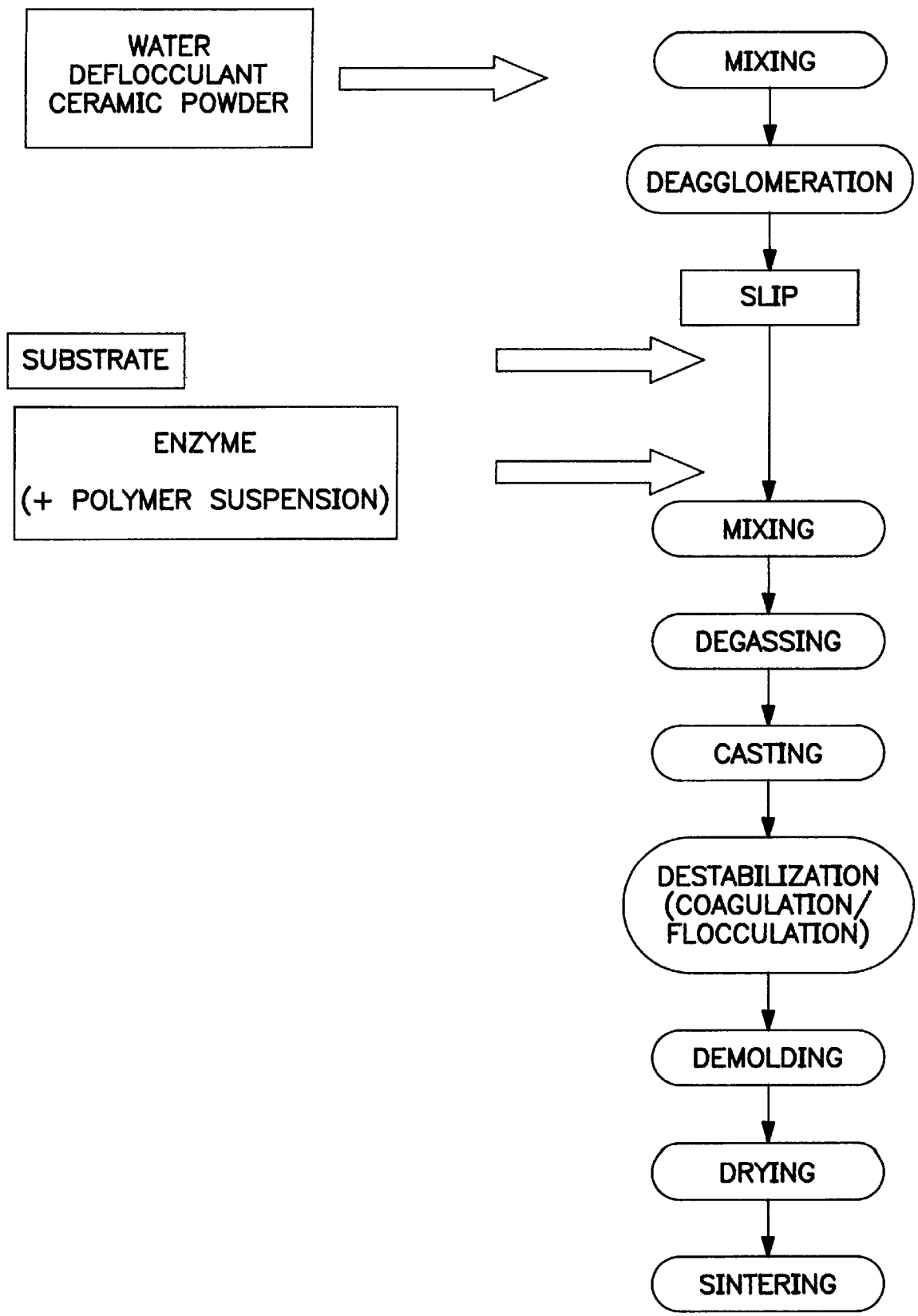

METHOD FOR THE FORMING OF CERAMIC GREEN PARTS

This application is a divisional of U.S. Ser. No. 08/624,715, filed Mar. 26, 1996 now U.S. Pat. No. 5,788,891, which in turn is a Continuation-In-Part of U.S. Ser. No. 08/211,139, filed May 9, 1994, now abandoned.

BACKGROUND OF THE INVENTION

The present invention is directed to a process for the production of ceramic green parts.

The following five forming methods are normally used to produce ceramic green parts:

1) pressing
2) isopressing
3) extrusion
4) slip casting and
5) injection molding.

The selection of the forming method is based on the shape, function, and number of pieces of the required part.

Free flowing, easily pressed starting powders are required for pressing and isopressing. For extrusion of parts with axial symmetry, powder mixtures with organic or inorganic plastifiers are used. As in polymer processing, injection molding is needed for complex shaped green parts. This process uses a mixture of a ceramic powder and a thermoplast which is put into a mold, and heated after forming to burn off the thermoplastic additives.

In slip casting, the ceramic powder and water are mixed with deflocculants and binders to give a free flowing slip, which is then poured into porous molds. The extraction of water by the mold (i.e. molds of gypsum or porous plastics) leads to the formation of green parts, which are dried after demolding and are subsequently sintered. This well known process is used to produce hollow green parts. Although useful for a variety of applications, it has several disadvantages:

1) the hardening of the green body depends upon the extraction of water; Therefore migration of soluble slip components may occur, resulting in an unequal particle distribution in the shaped green part,
2) the forming process is slow, and
3) density gradients are observed in the green body.

In addition, the final products possess low green strength and the green body workability is limited. Careful and time consuming drying of the porous mold is necessary before reuse. In addition, the casting of complex shapes is difficult and undercuts are hard to achieve.

Several attempts have been made in recent years to improve ceramic processing by transforming homogenous powder suspensions into solid like green bodies. This can be achieved by either consolidating the dispersion medium or by flocculating or coagulating the suspension particles.

Consolidating the dispersion medium is achieved in gel-casting when monomers in the suspension are polymerized. Polymerization can be induced by UV radiation, applying heat or by catalysts. In freezing casting the dispersion medium is consolidated by freezing and removed after demolding by sublimation.

Flocculation and coagulation of a highly dense packed particle system uses the control of interparticle forces in order to accomplish a liquid-solid transition. Flocculation and coagulation may by induced either by applying heat, or by changing the ionic strength of the suspension. A steric stabilized poser particle suspension has been used which becomes destabilized upon heating to form a rigid green body. One may first coagulate a suspension by adding salt, then increase the solids loading of this destabilized suspension to form a coagulated, plastic behaving, clay like mass which, after destabilization, fills in the mold. One may also work along the same line to produce a coagulated, clay like mass which, after destabilization can be vibrated into a mold to form the green body which is then demolded. The process is time consuming and produces unreliable ceramic parts. In this process the powder particle network which is formed during coagulation is disturbed during the shaping process by deforming the clay like mass into the mold.

SUMMARY OF THE INVENTION

The present invention has as its object an improved slip casting process which eliminates these disadvantages.

Pursuant to the invention this object is solved and there is provided a process for the production of ceramic green parts from a castable, aqueous slip wherein an active substance is added to the slip which changes the surface of the slip particles leading to solidification of the slip.

The invention provides a technically simple, quick, and inexpensive alternative to other known forming methods. In contrast to conventional slip casting, improvements in forming complex shaped green parts are possible, while the required microstructure, surface properties and mechanical properties are maintained. For example, this new slip casting process very largely suppresses migration and heterogeneous distribution of soluble components as the hardening step is not dominated by water withdrawal. In addition, the development of density gradients are avoided as the forming process is faster than in normal slip casting.

BRIEF DESCRIPTION OF THE DRAWING

The drawing shows a flow chart of the present invention.

DETAILED DESCRIPTION OF PREFERRED EMBODIMENTS

The new process is based on the idea that oxidic or non oxidic particles with an oxide surface layer react differently with water depending upon the pH (potential determining ions are $H^+$ and $OH^-$). The reaction produces a surface charge on the powder particles, creating a positive charge in acidic-water, and a negative charge in alkaline water. The resulting electrostatic charge (potential) determines the viscosity of the slip. In general, the higher the absolute value of the potential, the lower the viscosity and thus the better the castability of the slip. In between the alkaline and acidic region is the isoelectric point or IEP. At this point, the particles remain uncharged and the surface potential is almost zero. The viscosity of the slip is thus very high and it is no longer castable, i.e. it is rigid. The present invention takes advantage of this phenomenon to solidify the slip after casting by shifting the pH of the suspension to the IEP. This is in contrast to conventional, state of the art slip casting technology, where the green body is formed by water removal.

It is also in contrast to the practice that adds salt to the slip before shaping the ceramic green body part in order to produce a clay like mass which after coagulation is vibrated or centrifuged in the mold which is the shaping step of the green part. In accordance with the present invention, a stable, deagglomerated ceramic particle suspension is made by mixing powder particles with water and acid or base in order to obtain a charge powder particle surface at a pH of the slip which is far away of the isoelectric point of the powder. Then one (a substrate) or two substances (a substrate and a catalyst) are dissolved in this slip. These substances do not change the pH of the slip immediately. Then the stable slip is degassed in order to remove all air bubbles from the slip. Then the slip is cast into a mold which does not extract water from the slip like in conventional slip casting. After casting the time delayed, temperature sensitive decomposition reaction and/or the enzyme catalyzed decomposition reaction of the substrate produces products which shift the pH of the suspension towards the isoelectric point of the ceramic slip. Thereby the slip is destabilized (coagulated/flocculated) and solidifies to a solid, wet ceramic green body. Then the body can be handled and can be taken out of the mold, dried and sintered. A flow chart of the present invention is shown in the drawing.

As the time delayed reaction is thermally activated it can be controlled by controlling the temperature of the slip. By cooling the slip and/or the mixture of the slip and the catalyst to low temperatures, just slightly above the freezing temperature of the slip, the reaction can be considerably delayed compared to room temperature. By warming up to temperatures around 30 to typically 40° C., the reaction can be accelerated.

The preferred type of acid or base (substrate) is an agent which will decompose in the slip itself due to time delayed reactions. The decomposition products will then cause a shift in the pH of the suspension to the IEP, so producing solidification. This change in pH is possible starting from either the acidic or alkaline regions. The present invention favors use of organic molecules as the active agents (substrate).

In accordance with the present invention, suitable active substrates are organic molecules such as urea, carboxylic acid esters, e.g. acetic acid esters, decomposable carbohydrates, esters of glycerine, or carboxylic acid amides, used separately or as a mixture. If a mixture of an enzyme and one of the above mentioned substrates is used (the enzyme and substrate could also be added separately to achieve the solidification of the slip), hydrolases (e.g. urease, carboxylesterase, pectinesterase, acylase and lipase or oxydases such as glucose oxydase) are preferred. The role of the enzyme is to decompose the active substrate depending upon its nature to an acid or base and a second molecule. The acid or base is therefore a reaction product formed in the slip itself.

If a time delayed, temperature sensitive decomposition of the active substrate is preferred, i.e. without the influence of enzymes, the present invention uses as preferred substrates glycerolesters such as glycerinetriacatate, glycerinediacetate, or lactones such as gluconic acid lactone or glucuronic acid lactone, or sultones, as 1,3-propane-sultone or 1,4-butone-sultone.

The above mentioned pH shift is also used to increase the coagulation strength of the green body and to decrease the coagulation duration (solidification time). The pH sensitive network reaction of polymer molecules or the ion sensitive network forming of other polymers is controlled by this pH shift. Specially modified polyacrylate emulsions do not exhibit a change in viscosity at a pH of 4, while they show an increase in viscosity during a pH alteration to about 8 to 9. The combination of both, the solidification reaction and the pH sensitive discharge of an acidic ceramic slurry (caused by a urease catalyzed decomposition of urea), leads to an increase in coagulation strength by a factor of 5 to 10 which may be understood as a synergy effect.

In addition to the high coagulation strength, the green body may be demolded much easier in the wet condition (not dried). The same effect may be accomplished from the alkaline region. By using special sols (e.g. $SiO_2$ sol, an ultra-fine colloidal suspension with particles from 1 to 20 nm [Ludox TM, DuPont]) the coagulation strength is increased by the coagulation of the sol due to an increase of the ionic strength. For the same purpose, biopolymer based colloidal systems may be used. The viscosity of such solutions, e.g. carrageenan solution, may be increased due to time-delayed pH changing reactions by adding ions (e.g. ammonia or calcia ions), where the primary function of the ions is to cross-link functional groups (e.g. carboxylic groups) of the polymer molecules, and not predominantly to change the charge state of the powder particles.

A further increase in coagulation strength may be achieved by the use of polymers with ester groups. These polymers exhibit low viscosity in the esterified form. The formerly inactive carboxylic groups may show intermolecular interaction by hydrolysis of these ester groups. The resulting bridge forming between several macromolecules leads to a densification of the binder.

The above described ester hydrolysis may either take place in a strong alkaline environment by basic catalysis or in a weak alkaline environment by using enzymes which hydrolyse esters (Esterases).

The coagulation duration may be lowered by a factor of 2 to 4 by a temperature increase of 10 to 20° C.

Also this invention proposes an alternative means of moving to the IEP which involves moving the whole zeta-potential potential curve (specific for each composition) either from the acidic or base region along the solid-specific (e.g. aluminum oxide) resident zeta-potential curve. This is made possible by addition of acids into the acidic region and bases into the basic region. In other words, the zeta-potential curve is moved from any specific point in the direction of the IEP (which is situated on the abcissa of the zeta-potential diagram) and the liquid slip is then solidified. The movement of a zeta-potential curve from a basic into an acidic region or vice versa is chosen, so that slips which are highly loaded with solid can nevertheless be cast. They would otherwise be too stiff. For solidification of the now castable slip, an oxidizing reagent is added, which is able to decompose the deflocculant, internally. As a deflocculant for shifting the IEP to the acidic regions, 2,3,4-trihydroxybenzoic acid is preferred. As an oxidant for this deflocculant, hydrogen peroxide has been shown to be useful.

Another means of shifting the zeta-potential curve from the alkaline to the acidic region is by the addition of 4,5-dihydroxy-1,3-benzenedisulfonic acid as an organic deflocculant, and by use of a deflocculant decomposing enzyme, e.g. catechol oxidase. To shift the zeta-potential of a casting slip from the acidic to the alkaline region, in accordance with the present invention, organic molecules are added which, when coupled by an enzyme, become active deflocculants. These molecules are neither derivatives of acetylsalicyclic acid or precursors of citric or maleic acid. As preferred enzymes, arylester hydrolase or citrate synthase are used.

The invention is further illustrated by the following examples but it is not intended that these examples in any way be taken as limiting in field of application.

EXAMPLE 1

An acidic casting slip was prepared by adding 536 g aluminum oxide powder (HPA 0.5 with 0.05 wt. % MgO; Ceralox Corporation, USA) to a solution of 1.4 g conc. hydrochloric acid and 3.0 g urea in 97.0 g of deionized water. After ultrasonification the deagglomerated slip had a typical viscosity of 100 to 300 mPa s.

500–1000 units urease (EC 3.5.1.5) were added as a solution of 2000 units/ml urease to this processed slip to shift the pH along the zeta-potential curve towards the IEP (to the alkaline region). After homogenization of the ready-to-cast slip, it was poured into polymer or metal molds. Depending upon the reaction conditions, solidification of the slip occurred after 0.5 to 3 hours. Additional drying increased the strength of the green bodies. Demolding was done a few hours after casting either in the wet or in the dried condition. Increasing the temperature by 10° C. will reduce coagulation time by a factor of two.

The dried green parts were characterized by high green densities (58 to 62 vol. % depending upon the solid content of the casting slip) and by excellent sinterability.

EXAMPLE 2

An alkaline casting slip was prepared by adding 425 g aluminum oxide powder (HPA 0.5; Ceralox Corporation, USA) to a mixture with 0.85 g citric acid, 4.5 g acetic acid ethylester, 1.0 ml conc. ammonia solution (25%) and 73.0 g deionized water. The IEP of this slip was between 4 and 4.5. After deagglomeration and degassing a typical viscosity of 50–200 mPa s and a pH of 9 to 10 was observed for this castable slip.

To this slip, 100–200 units esterase (EC 3.1.1.1) were added as an aqueous solution. After casting, the enzyme addition lead to a pH shift from the alkaline region to the acidic region along the zeta-potential curve up to the IEP. After casting into metal or polymer molds solidification occurred depending upon reaction conditions in 1 to 3 hours.

The dried green parts were characterized by high green densities (60 to 62 vol. % depending upon solid content of the casting slip) and by excellent sinterability.

EXAMPLE 3

An alkaline casting slip with a pH of 9 to 9.5 was prepared by adding 425 g silicon carbide powder (Norton 10 LXC, Norton, Norway) to a mixture of 0.5 g conc. ammonia solution (25%), 3.5 g glucose and 100.0 g deionized water. After deagglomeration and degassing a typical viscosity of 500–1000 mPa s and a pH of 9 to 10 was observed for this castable slip.

To this slip 2000 units glucose oxidase (EC 1.1.3.4) were added as an aqueous solution with 1500 units/ml enzyme. After casting into metal or polymer molds solidification occurred depending upon reaction conditions and due to the shift of the suspension pH from the alkaline region towards the IEP in 0.5 to 2 hours. The dried green parts were characterized by green densities of 58 to 60%.

EXAMPLE 4

An alkaline casting slip with a ph of 10 was prepared by adding 260 g aluminum oxide powder (HPA 0.5; Ceralox Corporation, USA) to a mixture with 0.20 g Tiron (4,5-dihydroxy-1,3-benzenedisulfonic acid) and 0.5 g conc. ammonia solution (25%) in 49.0 g deionized water. After deagglomeration and degassing 1.0 g glycerine triacetate was added under vacuum to the high viscosity slip (typical viscosity 50–200 mPa s). After casting into metal or polymer molds solidification occurred due to the shift of the pH from the alkaline to the acidic region in 15–30 minutes.

Green densities of 58 to 60% were reached.

EXAMPLE 5

An alkaline casting slip with a pH of 10–11 was prepared by adding 260 g aluminum oxide powder (HPA 0.5; Ceralox Corporation, USA) to a solution of 0.20 g 2,3,4-trihydroxybenzoic acid and 0.30 g conc. ammonia solution (25%) in 50.0 g deionized water. After deagglomeration and degassing 0.50 ml hydrogen peroxide (30%) was added to the slip (viscosity ca. 500 mPa s). After casting into metal or polymer molds solidification occurred due to the shift of the IEP from the neutral to the alkaline region and by simultaneous shifting of the slip pH along the now changed zeta-potential curve to the IEP in 1 to 2 hours. The green parts were characterized by an extremely low content of organic additives (less than 0.1 wt. %) and had green densities of 58 to 60%.

EXAMPLE 6

An alkaline casting slip with a pH of 9–10 was prepared by adding 260 g aluminum oxide powder (HPA 0.5; Ceralox Corporation, USA) to a solution of 0.60 g Tiron (4,5-dihydroxy-1,3-benzenedisulfonic acid) and 1.30 g conc. ammonia solution (25%) in 50.0 g deionized water. After deagglomeration and degassing 500 units catechol oxidase (EC 1.14.18.1) as a solution with 100 units/ml were added to the low viscous slip (viscosity 100–500 mPa s). After casting into metal or polymer molds, solidification occurred due to the shift of the zeta-potential curve. This was caused by the decomposition of the added deflocculant (Tiron) due to its reaction with the added enzyme catechol oxidase. The green parts were characterized by a low content of organic additives (less than 0.5 wt. %) and had green densities of 58 to 60%.

EXAMPLE 7

An acidic casting slip with a pH of 5–6 was prepared by adding 280 g aluminum oxide powder (HPA 0.5; Ceralox Corporation, USA) to a solution of 0.60 g 2-carboxyacetylsalicylic acid in 50.0 g deionized water. After deagglomeration and degassing, 500 units arylester hydrolase (EC 3.1.1.2) in 0.5 ml water were added to the slip. After casting into metal or polymer molds solidification occurred due to the shift of the zeta-potential curve from the alkaline to the acidic pH region caused by the formation of the deflocculant salicylic acid. The green parts are characterized by green densities of 60 to 62%.

EXAMPLE 8

An alkaline casting slip with a pH of 9–10 was prepared by adding 400 g aluminum oxide powder (RCHP DBM; Reynolds, USA) to a solution of 0.80 g citric acid, 5.0 g acetic acid methyl ester. and 1.00 g conc. ammonia solution (25%) in 75.0 g deionized water. After deagglomeration, 80.0 g zirconia powder (TZP, SY Ultra 5.2; ICI Z-Tech, GB) in a mixture of 0.16 g citric acid and 0.15 g conc. ammonia solution (25%) in 20.0 g deionized water (pH 9–10) were added. After further deagglomeration and degassing, 500 units esterase (EC 3.1.1.1) were added. After casting into metal or polymer molds, solidification occurred in 15–30 minutes. The green parts were characterized by green densities of 55 to 62%.

EXAMPLE 9

An alkaline casting slip with a pH of 9–9.5 was prepared by adding 350 g zircon oxide (PSZ with 6 mole % $Y_2O_3$ Rhone-Poulenc, France) to a solution of 1.75 g acetic acid ethyl ester and 1.4 g ammoniumpolyacrylate solution (Darvan C, Wanderbilt, USA) in 49.0 g deionized water. After deagglomeration and degassing, 500 units esterase (EC 3.1.1.1) were added as a solution with 2000 units/ml to the slip (viscosity ca. 500 mPa s). After casting into metal or polymer molds, solidification occurred due to the shift of the pH from the alkaline to the acidic region. The green parts were characterized by green densities of about 55%.

EXAMPLE 10

An acidic casting slip was prepared by adding 797 g aluminum oxide powder (A 17 NE, Alcoa, BRD) to a solution of 1.60 g conc. hydrochloric acid and 3.0 g urea in 77.4 g of deionized water. At this time the slip had a pH of 4.5 to 5.

After addition of 3.0 ml of a binder solution (Acusol 820, Rohm & Haas, Germany or Rohagit SD 15 Röhm, Germany) the suspension had a pH of 4 to 4.5 and a viscosity of 100–500 mPa s.

After deagglomeration and degassing 910 units urease (EC 3.5.1.5) were added as a solution of 2000 units/ml urease to this processed slip. After casting into metal or polymer molds, solidification occurred after 30 to 60 minutes. The coagulated, but not dried green bodies are characterized by high coagulation strength. Thus easily demoldability in the wet form is achieved.

EXAMPLE 11

An alkaline casting slip with a pH of 11 was prepared by adding 673 g silicon nitride powder (LC 10, Starck, Germany) to a mixture of 40 g Ludox TM (Du Pont, USA), 10.0 g Tetramethylammoniumhydroxide solution and 10.0 g urea in 160.0 g of deionized water. After deagglomeration and degassing 1500 units Urease powder and 0.20 g glycerine triacetate were added to the slurry. After casting into metal or polymer molds solidification occurred depending upon reaction conditions in 30 to 60 minutes. The dried green parts were characterized by green densities of 50 to 55%.

EXAMPLE 12

An alkaline casting slip with a pH of 12 to 13 was prepared by adding 660 g silicon nitride powder (LC 10, Starck, Germany) to a solution of 2.5 g 1,6-Diaminohexane, 6.0 g Tetramthylammoniumhydroxide solution and 10.0 g urea in 155 g of deionized water. After deagglomeration and degassing 500 units Urease powder and 0.20 g glycerine triacetate as well as 2.0 g of a hydrolysable polymer were added to the slurry. After casting into metal or polymer molds solidification occurred in 30 to 60 minutes due to the hydrolysis of the ester group containing polymer and due to the simultaneously reduction of surface charge by shifting the pH towards the acidic region.

EXAMPLE 13

An alkaline casting slip with a pH of 11 to 12 was prepared by adding 660 g silicon nitride powder (LC 10, Starck, Germany) to a solution of 2.5 g 1,6-Diaminohexane, 4.0 g Tetramethylammoniumhydroxide solution and 10.0 g urea in 155 g of deionized water. After deagglomeration and degassing 500 units Urease powder and 0.20 g glycerine triacetate as well as 2.0 g of a hydrolyzable polymer were added to the slurry. Furthermore 2000 units of an esterase were added. After casting into metal or polymer molds solidification occurred in 30 to 60 minutes due to the hydrolysis of the ester group containing polymer and due to the simultaneously reduction of surface charge by shifting the pH towards the acidic region.

The previous examples are based on $Al_2O_3$, SiC, $Si_3N_4$, $ZrO_2$ and $Al_2O_3/ZrO_2$ —composites as ceramic materials. The invention is not limited to these examples, but is also applicable to all kinds of monolithic ceramic materials, such as $ZrO_2$ (TZP, PSZ, FSZ) Sic, $Si_3N_4$, $BaTiO_3$, $TiO_2$, mullite, MgO, ball clay, $B_4C$, $TiB_2$, BN and $SiO_2$. The invention can also be used for ceramic composites, e.g. fiber reinforced ceramics such as $Al_2O_3$SiC or SiC/C or for particle-reinforced ceramic such as $Al_2O_3/ZrO_2$ and $Al_2O_3/TiB_2$.

Further more, all of the mixtures in examples 1 to 9 are characterized by the fact that the reactions start in the mixtures at room temperature (15 to 30° C.).

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the production of a wet ceramic green part, which comprises:
   providing a castable, aqueous slip having slip particles therein, said slip particles having a surface charge;
   adding an active substance and an enzyme to the slip, wherein the enzyme is operative to decompose the active substance and wherein said active substance is a chemical which is decomposable due to a time delayed, enzymatically catalyzed reaction;
   thoroughly mixing and degassing the resultant slip;
   casting the thoroughly mixed and degassed slip into a mold to form a wet ceramic green part;
   waiting until decomposition products which change surface charge of the slip particles leading to solidification, are formed; and
   demolding the wet ceramic green part for drying and sintering.

2. The process of claim 1, wherein said active substance and enzyme are added separately to the slip.

3. The process of claim 1, wherein said active substance and enzyme are added to the slip as a mixture.

4. The process of claim 1, wherein said active substance is selected from the group consisting of urea, carboxylic acid esters, decomposable carbohydrates, esters of glycerol and carboxylic acid amides.

5. The process of claim 1, wherein said enzyme is selected from the group consisting of hydrolases and oxydases.

6. The process of claim 5, wherein said hydrolases are selected from the group consisting of urease, carboxylesterate, acetylestrase, pectinesterase, acylase, lipase and amidase.

7. The process of claim 5, wherein said oxydase is glucose oxidase.

8. The process of claim 1, including the step of further adding to said slip a polyacrylate emulsion which changes its structure due to a pH change from an acidic to an alkaline pH.

9. The process of claim 1, including the step of further adding to said slip a colloidal, inorganic sol which coagulates due to a pH change from an alkaline to an acidic pH.

10. The process of claim 9, wherein said colloidal inorganic sol is selected from the group consisting of silica, alumina, zirconia and titania particles with a medium particle size of 5–100 nm and a specific surface area of 20–400 $m^2/g$.

11. The process of claim 9, wherein said active substance is selected from the group consisting of urea, carboxylic acid esters, decomposable carbohydrates, esters of glycerol and carboxylic acid amides.

12. The process of claim 9, wherein said enzyme is selected from the group consisting of hydrolases and oxydases.

13. The process of claim 12, wherein said hydrolases are selected from the group consisting of urease, carboxylesterate, acetylestrase, pectinesterase, acylase, lipase and amidase.

14. The process of claim 12, wherein said oxydase is glucose oxidase.

15. The process of claim 1, wherein said active substance is a deflocculant and said enzyme is a deflocculant decomposing enzyme which is able to decompose the deflocculant due to a time delayed, enzymatically catalyzed reaction.

16. The process of claim 15, wherein said deflocculant 4,5-dihydroxy-1,3-benzenedisulfonic acid.

17. The process of claim 15, wherein said enzyme is catechol oxidase.

18. The process of claim 1, wherein said active substance includes non-deflocculating molecules and said enzyme is a deflocculant forming enzyme which is able to decompose the non-deflocculating molecules to a deflocculant due to a time delayed, enzymatically catalyzed reaction.

19. The process of claim 18, wherein said active substance includes derivatives of acetylsalicylic acid or precursors of citric acid.

20. The process of claim 18, wherein said enzyme is selected from the group consisting of arylester hydrolase and citrate synthase.

* * * * *